United States Patent [19]
Hargrove

[11] 4,093,343
[45] June 6, 1978

[54] OPTICAL WAVEGUIDE HAVING PERIODIC SPATIAL PERTURBATIONS

[75] Inventor: Logan Ezral Hargrove, Arlington, Va.

[73] Assignee: Bell Telephone Laboratories, Incorporated, Murray Hill, N.J.

[21] Appl. No.: 725,388

[22] Filed: Sep. 22, 1976

[51] Int. Cl.² .............................................. G02B 5/14
[52] U.S. Cl. .................................................. 350/96.30
[58] Field of Search ................................. 350/96 WG

[56] References Cited
U.S. PATENT DOCUMENTS

| | | | |
|---|---|---|---|
| 3,666,348 | 5/1972 | Marcatili | 350/96 WG |
| 3,687,514 | 8/1972 | Miller et al. | 350/96 WG |
| 3,909,110 | 9/1975 | Marcuse | 350/96.15 |

OTHER PUBLICATIONS

The Bell System Tech. Jour., vol. 53, No. 9, Nov. 1974, pp. 1795-1815.
D. Marcuse, "Reduction of Multimode Pulse Dispersion by Intential Mode Coupling".

*Primary Examiner*—John K. Corbin
*Assistant Examiner*—Stewart Levy
*Attorney, Agent, or Firm*—Bryan W. Sheffield; Sylvan Sherman

[57] ABSTRACT

An optical waveguide in which intermodal coupling is deliberately induced. Perturbations are introduced along the waveguide. The perturbations have a spatial frequency that varies along the guide from $f_1$ to $f_2$, where $f_2$ is $\leq$ the critical frequency above which coupling to unguided modes occurs and $f_1$ corresponds to the beat between the $n^{th}$ and the $(n + 1)^{th}$ modes, the lowest modes of interest propagating in the guide.

15 Claims, 8 Drawing Figures

OPTICAL WAVEGUIDE HAVING PERIODIC SPATIAL PERTURBATIONS

BACKGROUND OF THE INVENTION a. Field of the Invention

Broadly speaking, this invention relates to waveguides. More particularly, in a preferred embodiment, this invention relates to multimode optical waveguides wherein intermodal coupling is deliberately enhanced to reduce dispersion in the guide.

b. Discussion of the Prior Art

The desirability of deliberately enhancing coupling between the various modes propagating in a multimode optical waveguide has been widely discussed in the literature. See, for example, the article entitled "Reduction of Multimode Pulse Dispersion by Intentional Mode Coupling" by D. Marcuse, *The Bell System Technical Journal*, Vol. 53, No. 9, (November 1974), pp. 1795–1815, U.S. Pat. No. 3,909,110 which issued to D. Marcuse on Sept. 30, 1975, U.S. Pat. No. 3,666,348 which issued to E. A. J. Marcatili on May 30, 1972 and U.S. Pat. No. 3,687,514 which issued to S. E. Miller et al. on Aug. 29, 1972, all of which commonly-assigned patents and the cited BSTJ article are hereby incorporated by reference.

As taught in the above-identified patents and in the literature, to reduce dispersion in a waveguide longitudinal perturbations may be induced into the guide, the spatial periodicities of which correspond, for example, to the beat frequency wavelengths between the different modes propagating in the guide. The perturbations which are induced into the guide may be continuous or discrete and may comprise physical changes in the cross-section of the guide and/or periodic changes in the index of the core or cladding. Marcuse, in the cited article and in U.S. Pat. No. 3,909,110, has shown that, to avoid radiation losses, conditions should be imposed not only on the axial dependence of the fluctuations, but also on the azimuthal and radial dependence of the fluctuations.

My invention, in a preferred embodiment, comprises a waveguide of the type which is capable of guiding wave energy in a plurality of different modes of wave propagation having differing group velocities. The waveguide according to my invention is characterized by means for enhancing the coupling between guided modes, the enhancing means having a sharp cutoff near $f_2$, the critical spatial frequency at which energy is coupled to unguided modes.

This invention relates specifically to ways to realize the appropriate axial fluctuations and therefore the imposition of appropriate conditions on azimuthal and/or radial dependence of the fluctuations is assumed and is not explicitly considered herein.

The invention and its mode of operation will be more fully understood from the following detailed description, when taken with the appended drawings, in which:

DETAILED DESCRIPTION OF THE INVENTION

Figure 1:
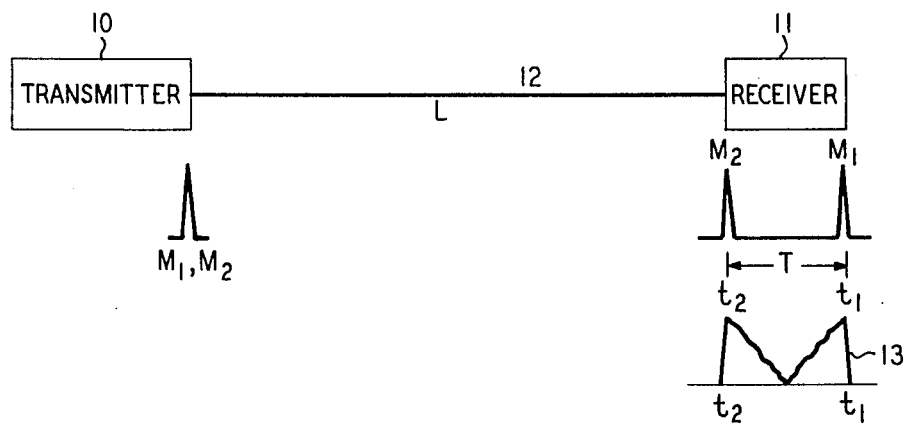
FIG. 1 is a schematic drawing of an illustrative optical communications system.
Figure 2:
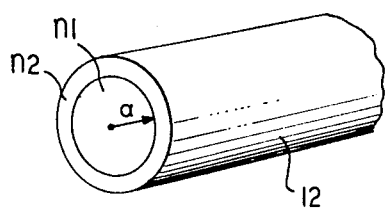
FIG. 2 is an isometric view of a typical prior-art optical fiber.

Referring to the drawings, FIG. 1 shows, in block diagram, a communication system comprising a signal transmitter 10, a receiver 11, and a waveguide 12 connecting the transmitter to the receiver. For purposes of illustration and discussion, an optical communication system is considered, wherein a waveguide 12, for example, as shown in FIG. 2, is a multimode, glass fiber having a circular cylindrical core of refractive index $n_1$, and radius $a$, surrounded by a cladding of refractive index $n_2$.

If signal pulses in two different modes $M_1$ and $M_2$ are applied, simultaneously, at the transmitter end of guide 12, as indicated in FIG. 1, the energy in each mode will propagate along the guide independently of the energy in the other mode, and each will arrive at the receive end of the guide at a time determined by its respective group velocity. Propagating at a velocity $v_1$, the pulse in mode $M_1$ will arrive after a time $t_1$ equal to $L/v_1$ while the pulse in mode $M_2$ will arrive after a time $t_2$ equal to $L/v_2$, where L is the guide length. The time difference $T = t_1 - t_2$ is the modal dispersion. Because any practical guide is not perfect, there will, in fact, be some coupling between the two modes so that energy tends to arrive at the receiver distributed over the entire interval between $t_1$ and $t_2$, producing an output pulse such as is given by cruve 13. (It will be noted that curve 13 neglects the effect of dispersion within the individual modes since, in oversize guides and, particularly, in dielectric waveguides, this effect is much smaller than the dispersion among the different modes).

In a qualitative sense, the above is equally-descriptive of what occurs when the waveguide is excited in only one mode, but power is fed into additional modes due to mode conversion along the guide. In either situation, the dispersion, due to the different group velocities for the different modes, manifests itself by a broadening of the transmitted pulse by an amount which is proportional to the guide length. Recognizing this, the thrust of the prior art was originally directed to means for perfecting waveguides so as to minimize mode conversion.

The present invention is based upon the new insight into the operation of a waveguide which is disclosed in the cited Marcuse article and in U.S. Pat. Nos. 3,666,348, 3,687,514 and 3,909,110. As therein stated, a multimode waveguide can be viewed as a multilane highway wherein traffic proceeds along different lanes at different velocities, corresponding to the different group velocities for the several modes. In a prior art waveguide, the energy in each of the different modes tends to remain primarily within one of the lanes (modes) throughout the length of the guide, with an occasional brief excursion (conversion) into one of the other lanes (modes). For the most part, however, the energy in each mode tends to remain in its particular modal configuration and to travel at its particular group velocity, arriving at the output end of the guide at a different time than the energy in the other modes.

By contrast, in the waveguide disclosed in U.S. Pat. No. 3,687,514, there is a deliberate random interchange of lanes, in that the energy in each mode is strongly and deliberately converted to each of the other modes, thereby forcing all of the energy to propagate at all of the different mode velocities. The result is that, on the average, all of the energy tends to arrive at the output end of the guide more nearly at the same time.

It can be shown that the output pulse width T resulting from an impulse input is given by $$T \alpha \sqrt{LL_c} \tag{1}$$

where L is the guide length and $L_c$ is a characteristic coupling length.

Since $L_c$ is inversely proportional to the mode coupling per unit length, the greater the coupling, the smaller $L_c$ and the narrower the output pulse.

Figure 3:
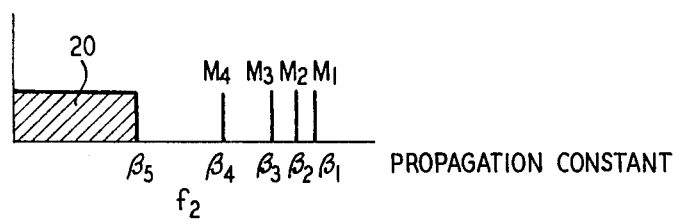
FIG. 3 is a graph showing the typical mode distribution in the waveguide shown in FIG. 2 as a function of phase constant.

FIG. 3 included for purposes of explanation, shows a typical mode distribution in a waveguide as a function of their propagation constant. In general, there is a distribution of discrete guided modes $M_1$, $M_2$, $M_3$ and $M_4$, having propagation constants $\beta_1$, $\beta_2$, $\beta_3$ and $\beta_4$, respectively. There is, in addition, a continuum of radiating modes starting at a phase constant $\beta_5$ that is less than the phase constants of the guided mode as represented by the area bounded by curve 20.

Unfortunately, in the mode coupling arrangements described above, there is coupling both among the guided modes, which produces a useful result, and among the guided and unguided modes, which results in a loss to the system. That is to say, these prior art arrangements result in coupling between modes $M_1$, $M_2$, $M_3$ and $M_4$ but also result in unwanted coupling between some of the guided modes and the unguided modes within the region defined by curve 20. However, Marcuse, in the cited article and in U.S. Pat. No. 3,909,110 described how radiation losses by coupling to unguided modes can be avoided by designing the coupling mechanism so that a definite selection rule is imposed. This can be achieved with appropriate azimuthal and radial fluctuations in addition to the axial perturbations having a sharp cutoff near spatial frequency $f_2$.

In order to realize the desired axial perturbations, that is to say, to provide a sharp cutoff of (axial) spatial frequency near $f_2$, $f_2$ where $= 2\pi/(\beta_3-\beta_4)$, the critical frequency above which light is coupled into unguided modes, I have discovered that it is advantageous to fabricate the waveguide such that the perturbations formed therein vary slowly from $f_1$ to $f_2$ along the waveguide, where $f_1$ is the spatial frequency corresponding to the beat frequency $2\pi/\beta_1-\beta_2$) between $M_1$ and $M_2$, the lowest modes of interest propagating in the guide. After the spatial frequency of the perturbations reaches $f_2$, the perturbations start over again at $f_1$ or return in a similar fashion to $f_1$. The pattern may be repeated along the waveguide, perhaps randomized by variations of the length of a cycle, or the start of a new cycle might occur with random delay. Two embodiments are particularly easy to fabricate; they are a sawtooth-shaped frequency-versus-position curve and a triangular-shaped frequency-versus-position curve, although smoother transitions, such as sinusoidal, may also be employed.

Figure 4:
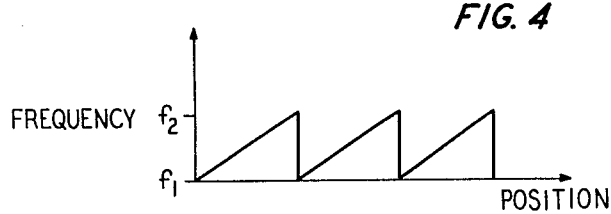
FIG. 4 is a graph showing a sawtooth-shaped spatial-frequency-versus-position characteristic for a waveguide according to this invention.
Figure 5:
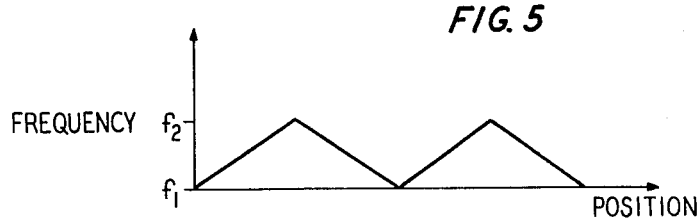
FIG. 5 is similar to FIG. 4 but shows a triangular-shaped characteristic.
Figure 6:
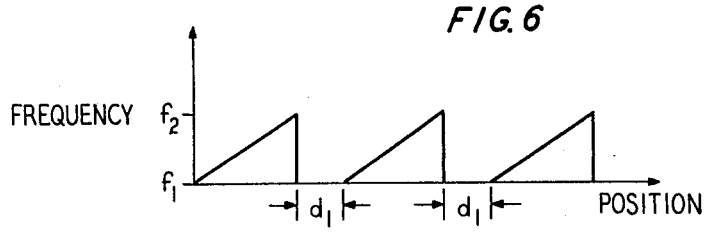
FIG. 6 is similar to FIG. 4 but depicts a fixed spatial interval between each group of perturbations in the guide.

FIG. 4 depicts the aforementioned sawtooth-shaped frequency-versus-position curve. As will be noted, the spatial frequency of the perturbations starts at $f_1$ and increases linearly to $f_2$, then drops rapidly to $f_1$, then repeats along the guide. In like manner, FIG. 5 depicts the triangular-shaped frequency-versus-position curve. Here, the spatial frequency starts at $f_1$, increases linearly to $f_2$, decreases linearly back to $f_1$, and so on. FIG. 6 is similar to FIG. 4 but shows the situation where a fixed distance $d_1$ separates the perturbed regions of the guide, that is the component parts of the sawtooth-shaped wave. Thus, in this embodiment the perturbations in the guide are not continuous, but are discrete.

Figure 7:
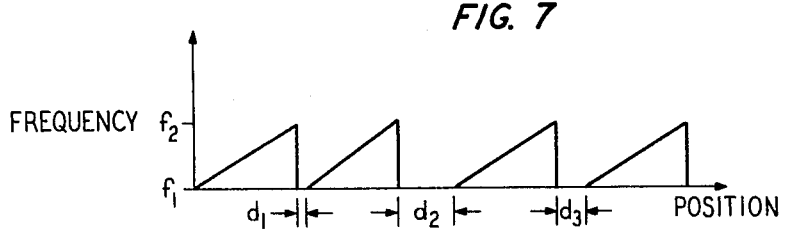
FIG. 7 is similar to FIG. 6 but depicts spatial intervals of varying length.
Figure 8:
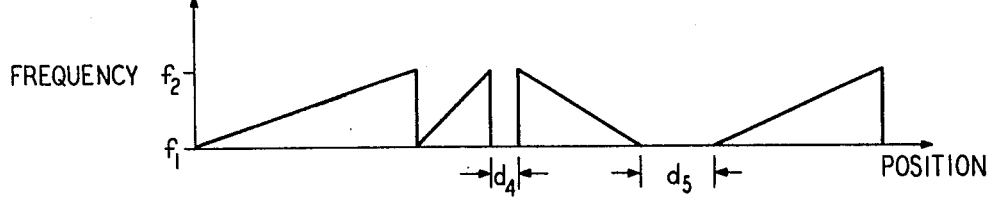
FIG. 8 is a graph depicting various combinations and permutations of the features shown in FIGS. 4–7.

FIG. 7 is similar to FIG. 6, however, here, the perturbations have been randomized in that the intervals between the perturbed regions of the guide are unequal, that is to say, $d_1 \neq d_2 \neq d_3$. FIG. 8 illustrates how it is possible to combine all of the above-described techniques. As shown, the spatial frequency of the perturbations starts at $f_1$ and increases linearly to $f_2$, then drops rapidly to $f_1$ and again increases linearly to $f_2$, but at a much faster rate. There is then a fixed distance, $d_4$, before the spatial frequency drops from $f_2$ down to $f_1$, again at a different rate and after another fixed distance, $d_5$, which is different than the distance $d_4$, the spatial frequency of the perturbations increases again from $f_1$ to $f_2$, and so on.

One skilled in the art will appreciate that various combinations and permutations of these techniques may be employed. Also, other substantially linear, or other arbitrary but specified, frequency functions may be employed and do not depart from the spirit of the present invention. For example, not shown in the drawing is the situation where the spatial frequency increases from $f_1$ to $f_2$ and back again along a sinusoidal or cosinusoidal-shaped curve.

While the invention has been described in connection with glass fibers for guided optical waves, the principles of the invention are equally applicable in connection with millimeter and microwave waveguide systems. Thus, in all cases it is understood that the above-described arrangements are illustrative of but a small number of the many possible specific embodiments which can represent applications of the principles of this invention. Numerous and varied other arrangements can readily be devised in accordance with these principles by those skilled in the art without departing from the spirit and scope of the invention.

What I claim is:

1. In a multimode waveguide capable of guiding wave energy at a frequency of interest in a plurality of different propagating modes, and of dissipating wave energy in the form of radiating modes, means, longitudinally distributed along said waveguide, for enhancing the coupling between selected pairs of propagating modes;

characterized in that:

the spatial frequency of said coupling-enhancing means varies between a first frequency $f_1$ and a second frequency $f_2$, where $f_1$ and $f_2$ are the spatial frequencies corresponding, respectively, to the beat frequency between the two lowest order propagating modes, and the two highest order propagating modes.

2. The waveguide according to claim 1 wherein the spatial frequency varies linearly between $f_1$ and $f_2$.

3. The waveguide according to claim 1 wherein said spatial frequency varies in an arbitrary manner between $f_1$ and $f_2$.

4. The waveguide according to claim 1 wherein said coupling-enhancing means comprise perturbations in the propagation characteristics of said waveguide.

5. A waveguide according to claim 4 wherein the spatial frequency of said perturbations varies repetitively between $f_1$ and $f_2$ and has a sawtooth-shaped frequency-versus-position characteristic.

6. A waveguide according to claim 4 wherein said waveguide contains unperturbed regions therealong interspersed between perturbed regions.

7. A waveguide according to claim 6 wherein said unperturbed regions are of equal length along the guide.

8. A waveguide according to claim 6 wherein said unperturbed regions are of unequal length along the guide.

9. A waveguide according to claim 6 wherein said unperturbed regions are of random length along the guide.

10. A waveguide according to claim 4 wherein the frequency of said perturbations varies repetitively from $f_1$ to $f_2$ to $f_1$ and has a sinusoidal-shaped frequency-versus-position characteristic.

11. A waveguide according to claim 4 wherein the frequency of said perturbations varies repetitively from $f_1$ to $f_2$ to $f_1$ and has a triangular-shaped frequency-versus-position characteristic.

12. A waveguide according to claim 11 wherein said guide contains unperturbed regions therealong interspersed between perturbed regions.

13. A waveguide according to claim 11 wherein said unperturbed regions are of equal length along the guide.

14. A waveguide according to claim 1 wherein said unperturbed regions are of unequal length along the guide.

15. A waveguide according to claim 11 wherein said unperturbed regions are of random length along the guide.

* * * * *